United States Patent
Massari et al.

(10) Patent No.: US 9,969,870 B2
(45) Date of Patent: May 15, 2018

(54) PROPYLENE-BASED POLYMER COMPOSITION

(71) Applicant: BASELL POLIOLEFINE ITALIA S.R.L., Milan (IT)

(72) Inventors: Paola Massari, Ferrara (IT); Marco Ciarafoni, Ferrara (IT); Tiziana Caputo, Ferrara (IT); Nicoletta Martini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days. days.

(21) Appl. No.: 15/313,456

(22) PCT Filed: Apr. 28, 2015

(86) PCT No.: PCT/EP2015/059239
§ 371 (c)(1),
(2) Date: Nov. 22, 2016

(87) PCT Pub. No.: WO2015/180916
PCT Pub. Date: Dec. 3, 2015

(65) Prior Publication Data
US 2017/0190893 A1 Jul. 6, 2017

(30) Foreign Application Priority Data
May 28, 2014 (EP) .................................... 14170323

(51) Int. Cl.
*C08L 23/16* (2006.01)
*C08L 23/14* (2006.01)

(52) U.S. Cl.
CPC ............. *C08L 23/142* (2013.01); *C08L 23/16* (2013.01); *C08L 2205/025* (2013.01); *C08L 2207/02* (2013.01)

(58) Field of Classification Search
CPC .. C08L 23/142; C08L 23/16; C08L 2205/025; C08L 2207/02
See application file for complete search history.

(56) References Cited

U.S. PATENT DOCUMENTS 7,390,575 B2    6/2008  Tayano et al.
2006/0041072 A1* 2/2006  Pelliconi et al. ....... C08L 23/10
                                                    525/240

FOREIGN PATENT DOCUMENTS

| CN | 1689801 A | 11/2005 |
| CN | 103524903 A | 1/2014 |
| WO | WO-2003076508 A1 | 9/2003 |
| WO | WO-2005103140 A1 | 11/2005 |
| WO | WO-2010112337 A1 | 10/2010 |

OTHER PUBLICATIONS

PCT International Publication and Search Report dated Aug. 10, 2015 (dated Aug. 10, 2015) for Corresponding PCT/EP2015/059239.

* cited by examiner

*Primary Examiner* — Nathan M Nutter

(57) ABSTRACT

A propylene polymer composition comprising:
A) from 81 wt % to 91 wt % of a propylene ethylene copolymer containing from 1.0 wt % to 3.5 wt % of ethylene derived units having a fraction soluble in xylene at 25° C. comprised between 10 wt % and 3 wt %; and a melt flow rate ranging from 5 to 50 g/10 min;
B) from 9 wt % to 19 wt %, of a copolymer of propylene and ethylene with from 21.0 wt % to 31.0 wt % of ethylene derived units;
the sum A)+B) being 100;
the composition having an melt flow rate ranging from 20 to 35 g/10 min; the xylene soluble fraction to 25° C. ranging from 13.0 wt % to 25.0 wt % and the intrinsic viscosity of the fraction soluble in xylene at 25° C. ranging from 0.7 dl/g to 1.9 dl/g.

8 Claims, No Drawings

US 9,969,870 B2

PROPYLENE-BASED POLYMER COMPOSITION

This application is the U.S. National Phase of PCT International Application PCT/EP2015/059239, filed Apr. 28, 2015, claiming benefit of priority to European Patent Application No. 14170323.1, filed May 28, 2014, the contents of which are incorporated herein by reference in its entirety.

FIELD OF THE INVENTION

The present disclosure relates to a propylene-based polymer composition having a high melt flow rate for injection molding for the production of containers, particularly containers for food.

BACKGROUND OF THE INVENTION

Polyolefins may be used to produce injection molded articles and containers for food products. Polypropylene heterophasic compositions, due to their impact resistance properties that extend at low temperatures, can be used in the production of containers for frozen food products. While polymers for the injection molding may have a a high melt flow rate (MFR), the high MFR can be detrimental for some mechanical and optical properties.

WO 2006/114357 relates to a propylene polymer composition comprising (weight percentages being referred to the sum of A+B):
(A) 60-90% by weight of a copolymer of propylene with ethylene containing less than 2.5% wt of ethylene units; and
(B) 10-40% by weight of a copolymer of propylene comprising from 15 to 35% wt of ethylene units,
said polymer composition having a melt flow rate value according to ISO 1133 (230° C., 2.16 Kg) of less than 10 g/10 min Even if these compositions show good values of Haze and Izod the MFR may be too low to be used in injection molding.

US 2004/0266952 relates to a propylene polymer composition comprising (percent by weight):
A) from 50 to 90% of one or more propylene copolymer (s) having a content of moiety insoluble in xylene at room temperature of not less than 85%, selected from the group consisting of (A1) random copolymers of propylene with ethylene containing from 1 to of ethylene; (A2) copolymers of propylene with one or more C4-C8 a-olefin(s) containing 2-10% of the C4-C8 a-olefin(s); and (A3) copolymers of propylene with ethylene and one or more C4-C8 a-olefin(s) containing 0.5-5% of ethylene and 2-6% of C4-C8 a-olefins; and
B) from 10 to 50% of a copolymer of propylene containing from 8 to 40% of ethylene and optionally 1-10% of a C4-C8 a-olefins;
wherein the propylene polymer composition has an MFR (2) value of from 3 to 30 g/10 min obtained by subjecting to degradation a precursor composition comprising the same copolymers (a) and (b) in the above said proportions having an MFR (1) value of from 0.1 to 5 g/10 min, with a ratio MFR (2) to MFR (1) of from 1.5 to 20.

In the examples the value of impact properties of the visbroken polymer may be high, however, the haze measured on a film may be low.

The applicant found a propylene polymer composition containing propylene and ethylene having an high MFR can be fine-tuned in order to achieve an optimum balance of mechanical and optical properties for the production of injection molded articles, such as containers.

SUMMARY OF THE INVENTION

An object of the present disclosure is a propylene polymer composition comprising:
A) from 81 wt % to 91 wt %, of a propylene ethylene copolymer containing from 1.0 wt % to 3.5 wt % of ethylene derived units having a fraction soluble in xylene at 25° C. comprised between 10 wt % and 3 wt %; and a melt flow rate (MFR L according to ISO 1133, condition L, i.e. 230° C. and 2.16 kg load) ranging from 5 to 50 g/10 min;
B) from 9 wt % to 19 wt %, of a copolymer of propylene and ethylene with from 21.0 wt % to 31.0 wt %, of ethylene derived units;
the sum A)+B) being 100;
the composition having an melt flow rate (MFR L according to ISO 1133, condition L, i.e. 230° C. and 2.16 kg load) ranging from 20 to 35 g/10 min; the xylene soluble fraction to 25° C. ranging from 10.0 wt % to 25.0 wt % and the intrinsic viscosity of the fraction soluble in xylene at 25° C. ranging from 0.7 dl/g to 1.9 dl/g.

DETAILED DESCRIPTION OF THE INVENTION

An object of the present disclosure is a propylene polymer composition comprising:
A) from 81 wt % to 91 wt %, alternatively from 82 wt % to 90 wt %, alternatively from 83 wt % to 89 wt %, of a propylene ethylene copolymer containing from 1.0 wt % to 3.5 wt %, alternatively from 1.5 wt % to 3.0 wt % of ethylene derived units having a fraction soluble in xylene at 25° C. comprised between 10 wt % and 3 wt %; alternatively between 8 wt % and 4 wt % and a melt flow rate (MFR L according to ISO 1133, condition L, i.e. 230° C. and 2.16 kg load) ranging from 5 to 50 g/10 min including from 10 to 40 g/10 min and from 15 to 30 g/10 min;
B) from 9 wt % to 19 wt %, alternatively from 10% to 18 wt % or from 11 wt % to 17 wt % of a copolymer of propylene and ethylene with from 21.0 wt % to 31.0 wt %, alternatively from 23.0 wt % to 29.0 wt %, or from 25.0 wt % to 28.0 wt %; of ethylene derived units;
the sum A)+B) being 100;
the composition having an melt flow rate (MFR L according to ISO 1133, condition L, i.e. 230° C. and 2.16 kg load) ranging from 20 to 35 g/10 min, alternatively from 22 to 32 g/10 min or from 24 to 29 g/10 min; the xylene soluble fraction to 25° C. ranging from 10.0 wt % to 25.0 wt % alternatively from 13.0 wt % to 20.0 wt % or from 16.0 wt % to 19 wt % and the intrinsic viscosity of the fraction soluble in xylene at 25° C. ranging from 0.7 dl/g to 1.9 dl/g, or alternatively from 0.9 dl/g to 1.4 dl/g.

For the purpose of the present disclosure the term "copolymer" includes polymers containing only propylene and ethylene monomers.

The propylene polymer composition according to the present disclosure is may not be visbroken.

For the purpose of the present disclosure the term "container" means any kind of object able to contain liquid or solid matter. Said container may have one or more bottom parts, optionally one or more top parts and one or more lateral walls. The lateral walls and the bottom and top part (when present) may have a thickness ranging from 0.1 mm to 5 mm, alternatively from 0.2 mm to 3 mm or from 0.3 mm to 2 mm. Examples are containers for ice cream, eggs, yoghurt, fish and frozen fish.

The MFR of the polyolefin composition to be used for obtaining the container object of the present disclosure can be obtained directly as ex-reactor polymer, i.e. with one or more polymerization step, and not by blending components A) and B), optionally with the addition of additives but without alteration of its chemical structure by any treatment such as radiation treatment or chemical degradation, such as visbreaking. This allows for a material having a desirable MFR but without the drawback of the degraded polymers, Materials that can be used in injection molding processes may have a high MFR to allow the polymer to be easily injected in the mold. However, a high MFR polymers may not have satisfactory mechanical and optical properties. The balance of the various parameters of the propylene polymer composition of the present disclosure such as ethylene content, split (amount of component A and B), MFR and intrinsic viscosity allows for a material that can be used in order to obtain injection molded articles, including but not limited to containers.

The propylene polymer composition fit for the production of the container according to the present disclosure may possess a flexural modulus ranging from 700 MPa to 1100 MPa or alternatively from 750 MPa and 1000 MPa.

The polyolefin composition of the present disclosure can be prepared by sequential polymerization in at least two stages, with each subsequent polymerization stage being conducted in the presence of the polymeric material formed in the immediately preceding polymerization reaction, wherein the component (A) is prepared in at least one first polymerization stage and the component (B) is prepared in at least one second polymerization stage.

Each polymerization stage is carried out in presence of a highly stereospecific heterogeneous Ziegler-Natta catalyst. The Ziegler-Natta catalysts producing the propylene polymer compositions of the present disclosure comprise a solid catalyst component comprising at least one titanium compound having at least one titanium-halogen bond and at least an electron-donor compound (internal donor), both supported on magnesium chloride. The Ziegler-Natta catalysts systems further may comprise an organo-aluminum compound as a co-catalyst and optionally an external electron-donor compound.

Catalysts systems are described in the European patents EP45977, EP361494, EP728769, EP 1272533 and in the international patent application WO00163261.

The propylene polymer of the present disclosure may be obtained by polymerizing propylene and ethylene in various stages in the presence of a catalyst system comprising the product obtained by contacting the following components:

(a) a solid catalyst component comprising a magnesium halide, a titanium compound having at least a Ti-halogen bond and at least two electron donor compounds one of which being present in an amount from 40 to 90% by mol with respect to the total amount of donors and selected from succinates and the other being selected from 1,3 diethers, (b) an aluminum hydrocarbyl compound, and (c) optionally an external electron donor compound.

In the solid catalyst component (a) the succinate may be selected from succinates of formula (I)

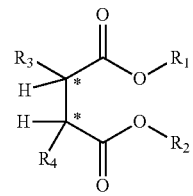

(I)

in which the substituent groups $R^1$ and $R^2$, may be equal to, or different from, each other are a $C_1$-$C_{20}$ linear or branched alkyl, alkenyl, cycloalkyl, aryl, arylalkyl or alkylaryl group, optionally containing heteroatoms; and the substituent groups $R^3$ and $R^4$ may be equal to, or different from, each other, are $C_1$-$C_{20}$ alkyl, $C_3$-$C_{20}$ cycloalkyl, $C_5$-$C_{20}$ aryl, arylalkyl or alkylaryl group with the proviso that at least one of the substituent groups is a branched alkyl; said compounds being, with respect to the two asymmetric carbon atoms identified in the structure of formula (I), stereoisomers of the type (S,R) or (R,S)

$R^1$ and $R^2$ may be $C_1$-$C_8$ alkyl, cycloalkyl, aryl, arylalkyl and alkylaryl groups, and $R^1$ and $R^2$ substituent groups selected from primary alkyls and branched primary alkyls may be desired. Examples of $R^1$ and $R^2$ groups can be methyl, ethyl, n-propyl, n-butyl, isobutyl, neopentyl, 2-ethylhexyl.

Compounds in which the $R^3$ and/or $R^4$ substituent groups are secondary alkyls like isopropyl, sec-butyl, 2-pentyl, 3-pentyl or cycloakyl s like cyclohexyl, cyclopentyl, cyclohexylmethyl may be desired as well.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropyl succinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the 1,3-diethers mentioned above, compounds of formula (II) may include compounds

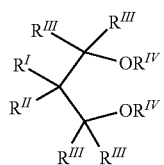

(II)

where $R^I$ and $R^{II}$ may be the same or different and may be hydrogen or linear or branched $C_1$-$C_{18}$ hydrocarbon groups which can also form one or more cyclic structures; $R^{III}$ groups, may be equal or different from each other, may be hydrogen or $C_1$-$C_{18}$ hydrocarbon groups; $R^{IV}$ groups may be equal or different from each other, have the same meaning of $R^{III}$ except that these substituent groups cannot be hydrogen; each of $R^I$ to $R^{IV}$ groups can contain heteroatoms selected from halogens, N, O, S and Si.

$R^{IV}$ may be a 1-6 carbon atom alkyl radical and more particularly a methyl while the $R^{III}$ radicals may be hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; RI and RII can also be the same and can be ethyl, propyl, isopropyl, butyl, isobutyl, tert-butyl, neopentyl, phenyl, benzyl, cyclohexyl, cyclopentyl.

Specific examples of ethers that can be used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, the 1,3-diethers of formula (III) may include

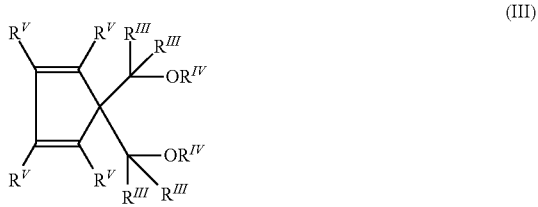

(III)

where the substituent group $R^{IV}$ has the same meaning explained above and the substituent groups $R^{III}$ and $R^V$, may be equal or different to each other, and selected from the group consisting of hydrogen; halogens, including Cl and F; $C_1$-$C_{20}$ alkyl groups, linear or branched; $C_3$-$C_{20}$ cycloalkyl, $C_6$-$C_{20}$ aryl, $C_7$-$C_{20}$ alkaryl and $C_7$-$C_{20}$ aralkyl and two or more of the $R^V$ can be bonded to each other to form condensed cyclic structures, saturated or unsaturated, optionally substituted with $R^{VI}$ selected from the group consisting of halogens, including Cl and F; C1-C20 alkyl groups, linear or branched; $C_3$-$C_{20}$ cycloalkyl, $C_6$-$C_{20}$ aryl, $C_7$-$C_{20}$ alkaryl and $C_7$-$C_{20}$ aralkylgroups; said substituent groups $R^V$ and $R^{VI}$ optionally containing one or more heteroatoms as substitutes for carbon or hydrogen atoms, or both.

In the 1,3-diethers of formulae (I) and (II) the $R^{III}$ radicals may be hydrogen, and the $R^{IV}$ radicals may be methyl. Moreover, the 1,3-diethers of formula (II) in which two or more of the $R^V$ substituent groups can be bonded to each other to form one or more condensed cyclic structures, including benzenic, optionally substituted by $R^{VI}$ substituent groups, may be desired. The compounds of formula (IV) include:

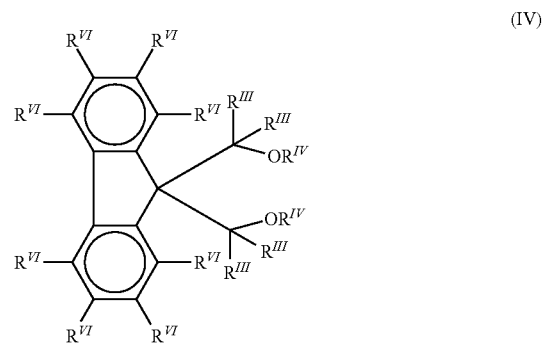

(IV)

where the $R^{VI}$ may be equal or different are hydrogen; halogens, including Cl and F; $C_1$-$C_{20}$ alkyl groups, linear or branched; $C_3$-$C_{20}$ cycloalkyl, $C_6$-$C_{20}$ aryl, $C_7$-$C_{20}$ alkylaryl and $C_7$-$C_{20}$ aralkyl groups, optionally containing one or more heteroatoms selected from the group consisting of N, O, S, P, Si and halogens, including Cl and F, as substitutes for carbon or hydrogen atoms, or both;

and $R^{IV}$ may be as defined above for formula (II).

Specific examples of compounds comprised in formulae (II) and (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopentylindene;

1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the catalyst component (a) comprises, in addition to the above electron donors, a titanium compound having at least a Ti-halogen bond and a Mg halide. The magnesium halide may be MgCl2 in active form as a support for Ziegler-Natta catalysts. U.S. Pat. No. 4,298,718 and U.S. Pat. No. 4,495,338 describe the use of these compounds in Ziegler-Natta catalysis. Magnesium dihalides in active form used as support or co-support in components of catalysts for the polymerization of olefins may be characterized by X-ray spectra in which the intensity of diffraction lines that appear in the spectrum of the non-active halide may be diminished in intensity and replaced by a halo whose maximum intensity may be displaced towards lower angles relative to that of the more intense line.

Titanium compounds used in the catalyst component of the present disclosure can be TiCl4 and TiCl3; furthermore, also Ti-haloalcoholates of formula Ti(OR)n-yXy can be used, where n is the valence of titanium, y is a number between 1 and n−1 X is halogen and R is a hydrocarbon radical having from 1 to 10 carbon atoms.

The catalyst component (a) has an average particle size ranging from 15 to 80 μm, alternatively from 20 to 70 μm or from 25 to 65 μm. As explained the succinate may be present in an amount ranging from 40 to 90% by mol with respect to the total amount of donors. It may range from 50 to 85% by mol or from 65 to 80% by mol. The 1,3-diether may constitute the remaining amount.

The alkyl-Al compound (b) may be chosen among the trialkyl aluminum compounds such as for example triethylaluminum, tri-n-hexylaluminum, tri-n-octylaluminum. It may also be possible to use mixtures of trialkylaluminum's with alkylaluminum halides, alkylaluminum hydrides or alkylaluminum sesquichlorides such as AlEt2Cl and Al2Et3Cl3.

External electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of external donor compounds include silicon compounds of formula Ra5Rb6Si(OR7)c, where a and b are integer from 0 to 2, c is an integer from 1 to 3 and the sum (a+b+c) is 4; R5, R6, and R7, are alkyl, cycloalkyl or aryl radicals with 1-18 carbon atoms optionally containing heteroatoms. Methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane may also be silicon compounds that can be used. The external electron donor compound may be used in such an amount to give a molar ratio between the organo-aluminum compound and said electron donor compound of from 5 to 500, alternatively from 5 to 400 or from 10 to 200.

The catalyst forming components can be contacted with a liquid inert hydrocarbon solvent such as, e.g., propane, n-hexane or n-heptane, at a temperature below about 60° C. and from about 0 to 30° C. for a time period of from about 6 seconds to 60 minutes.

The above catalyst components (a), (b) and optionally (c) can be fed to a pre-contacting vessel, in amounts such that the weight ratio (b)/(a) is in the range of 0.1-10 and if the compound (c) is present, the weight ratio (b)/(c) is weight ratio corresponding to the molar ratio as defined above. The said components are pre-contacted at a temperature of from 10 to 20° C. for 1-30 minutes. The precontact vessel may be a stirred tank reactor.

The precontacted catalyst is then fed to a prepolymerization reactor where a prepolymerization step takes place. The prepolymerization step can be carried out in a first reactor selected from a loop reactor or a continuously stirred tank reactor, and is generally carried out in liquid-phase. The liquid medium comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the total amount of alpha-olefins or alternatively lower than 20% by weight. Said step (a) may be carried out in the absence of inert hydrocarbon solvents.

The average residence time in this reactor may range from 2 to 40 minutes or alternatively from 10 to 25 minutes. The temperature may range between 10° C. and 50° C. or alternatively between 15° C. and 35° C. Adopting these conditions allows a pre-polymerization degree in the range from 60 to 800 g per gram of solid catalyst component or alternatively from 150 to 500 g per gram of solid catalyst component. Step (a) may further be characterized by a low concentration of solid in the slurry, in the range from 50 g to 300 g of solid per liter of slurry.

The polymerization process can be carried out in gas phase and/or in liquid phase, in continuous or batch reactors, such as fluidized bed or slurry reactors. For example, it may be possible to carry out the polymerization of the propylene polymer (A) in liquid phase, using liquid propylene as diluent, while the copolymerization stage to obtain the propylene copolymer fraction (B) can be carried out in gas phase, without intermediate stages except for the partial degassing of the monomers. Alternatively, the sequential polymerization stages can be carried out in gas phase. The reaction time, temperature and pressure of the polymerization steps are not necessarily critical, and the temperature for the preparation of fraction (A) and (B), that can be the same or different, may be from 50° C. to 120° C. The polymerization pressure may range from 0.5 to 12 MPa if the polymerization is carried out in gas-phase. The catalytic system can be pre-contacted (pre-polymerized) with small amounts of olefins. The molecular weight of the propylene polymer composition may be regulated by using regulators, such as hydrogen.

In the second stage of the polymerization process, the propylene/ethylene copolymer (B) is produced in a conventional fluidized-bed gas-phase reactor in the presence of the polymeric material and the catalyst system coming from the preceding polymerization step. The propylene polymer compositions of the present disclosure can also be obtained by separately preparing the said copolymers (A) and (B), operating with the same catalysts and under the same polymerization conditions as previously illustrated and subsequently mechanically blending said copolymers in the molten state using mixing apparatuses, like twin-screw extruders.

The polyolefin composition used for the containers of the present disclosure may further comprise additives employed in the polyolefin field, such as antioxidants, light stabilizers, nucleating agents, antiacids, colorants and fillers.

According to another aspect, the present disclosure relates to a process for the preparation of a container, which process comprises injection molding a polyolefin composition according to the present disclosure.

The following examples are given to illustrate and not to limit the present disclosure.

EXAMPLES

The data of the propylene polymer materials were obtained according to the following methods:

Melt Flow Rate

Determined according to ISO 1133 (230° C., 2.16 kg).

Ethylene Content of the Polymers (C2 Content)

Ethylene content has been determined by FT-IR spectroscopy. The sample of a pressed film has been prepared according to ASTM D5576-00 (2013).

The spectrum of a pressed film of the polymer was recorded in absorbance vs. wavenumbers (cm−1). The following measurements were used to calculate C2 content:

a) Area (At) of the combination absorption bands between 4482 and 3950 cm−1 which is used for spectrometric normalization of film thickness.

b) Area (AC2) of the absorption band due to methylenic sequences (CH2 rocking vibration) after a proper digital subtraction of an isotactic polypropylene (IPP) reference spectrum. The range 660 to 790 cm−1.

The ethylene content of component B) has been calculated according to the following equation:

$$C2tot = X1 \cdot C2A + X2 \cdot C2B$$

Wherein C2tot was the total ethylene content; C2A was the ethylene content of component A; C2B was the ethylene content of component B) and X1 and X2 were the fraction of components A and B (X1+X2=1).

Molar Ratios of the Feed Gases

Determined by gas-chromatography.

Samples for the Mechanical Analysis

Samples have been obtained according to ISO 1873-2: 2007 excepting for the flexural modulus for which ISO 3167 has been used.

Flexural Modulus

Determined according to ISO 178.

Haze (on 1 mm Plaque)

According to the method used, 5×5 cm specimens were cut from molded plaques of 1 mm thick and the haze value was measured using a Gardner photometric unit connected to a Hazemeter type UX-10 or an equivalent instrument having G.E. 1209 light source with filter "C". Reference samples of known haze were used for calibrating the instrument. The plaques to be tested were produced according to the following method.

75×75×1 mm plaques were molded with a GBF Plastiniector G235190 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
Second stage 10 sec
Cooling time: 20 sec
Mold water temperature: 40° C.

Melting Temperature, Melting Enthalpy and Crystallization Temperature

Determined by differential scanning calorimetry (DSC). A sample weighting 6±1 mg, was heated to 220±1° C. at a rate of 20° C./min and kept at 220±1° C. for 2 minutes in nitrogen stream and it was thereafter cooled at a rate of 20° C./min to 40±2° C., and kept at this temperature for 2 min to crystallize the sample. Then, the sample was again heated at a temperature rise rate of 20° C./min up to 220° C.±1. The melting scan was recorded, a thermogram was obtained, and, from this, melting temperatures was read.

Xylene Soluble and Insoluble Fractions at 25° C. (Room Temperature)

2.5 g of polymer and 250 cm3 of xylene were introduced in a glass flask equipped with a reflux condenser and a magnetic stirrer. The temperature was raised in 30 minutes up to the boiling point of the solvent. The clear solution was then kept under reflux and stirring for further 30 minutes. The closed flask was then kept for 30 minutes in a thermostatic water bath at 25° C. for 30 minutes. The so formed solid was filtered on quick filtering paper. 100 cm$^3$ of the filtered liquid was poured in a previously weighed aluminum container which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated. The percent by weight of polymer insoluble in xylene at room temperature was considered the Isotacticity Index of the polymer. This value corresponds to the Isotacticity Index determined by extraction with boiling n-heptane, which by definition constitutes the Isotacticity Index of polypropylene.

Intrinsic Viscosity (I.V.)

Determined in tetrahydronaphthalene at 135° C.

IZOD Impact Strength

Determined according to ISO 180/1A

Example 1 and Comparative Examples 2-3

Preparation of the Solid Catalyst Component

Into a 2000 mL five-necked glass reactor, equipped with mechanical stirrer, reflux condenser, and a thermocouple, purged with nitrogen, 1000 mL of TiCl4 were introduced and the reactor cooled at −5° C. While stirring, 60.0 g of microspheroidal MgCl2.1.7C2H5OH having average particle size of 58 μm (prepared in accordance with the method described in example 1 of EP728769) was added at −5° C. The temperature was raised at 40° C. and an amount of diethyl 2,3-diisopropylsuccinate such as to have a Mg/succinate molar ratio of 13 was added. The temperature was raised to 100° C. and kept at this value for 60 min. After that the stirring was stopped for 15 min and the solid settled down. The liquid was siphoned off. After siphoning, fresh TiCl4 and an amount of 9,9-bis(methoxymethyl)fluorene was added to have a Mg/diether molar ratio of 26. Then the temperature was raised to 110° C. and kept for 30 minutes under stirring. The reactor was then cooled at 75° C. and the stirrer was stopped for 15 min. After sedimentation and siphoning, fresh TiCl4 was added. Then the temperature was raised to 90° C. and the suspension was stirred for 15 min. The temperature was then decreased to 75° C. and the stirrer was stopped, for 15 min. After sedimentation and siphoning, the solid was washed six times with anhydrous hexane (6×1000 ml) at 60° C. and one time with hexane at 25° C. The solid was dried in a rotary evaporator.

Preparation of the Catalyst System

Before introducing it into the polymerization reactors, the solid catalyst component described above was contacted with aluminum-triethyl (TEAL) and dicyclopentyl-dimethoxysilane (DCPMS) at a temperature of 15° C.

Prepolymerization

The catalyst system was then subject to prepolymerization treatment at 20° C. by maintaining it in suspension in liquid propylene for 9 minutes before introducing it into the polymerization reactor.

Polymerization

The polymerization runs were conducted continuously in a series of two reactors equipped with devices to transfer the product from one reactor to the one immediately next to it. The first reactor was a polymerization apparatus as described in EP 1 012 195.

The catalyst was sent to the polymerization apparatus that comprises two interconnected cylindrical reactors, riser and downcomer. Fast fluidization conditions were established in the riser by recycling gas from the gas-solid separator. The obtained product was then fed to a fluid bed gas phase reactor. Hydrogen was used as molecular weight regulator.

Component (A) was prepared in the first reactor, while component (B) is prepared in the second reactor.

Hydrogen was used as molecular weight regulator.

The gas phase (propylene, ethylene and hydrogen) was continuously analyzed via gas-chromatography.

At the end of the run the powder was discharged and dried under a nitrogen flow.

The main polymerization conditions are reported in Table 1.

TABLE 1

|  |  | Example | | |
|---|---|---|---|---|
|  |  | Comp ex 2 | ex 1 | Comp ex 3 |
| Component A) (reactor MZCR) | | | | |
| TEAL/external donor | wt/wt | 6 | 6 | 5 |
| TEAL/catalyst | wt/wt | 6 | 6 | 4 |
| Temperature | ° C. | 73 | 73 | 73 |
| Pressure | bar-g | 27 | 27 | 27 |
| Split     riser | wt % | 40 | 40 | 40 |
| holdup     downcomer | wt % | 60 | 60 | 60 |
| $C_3^-$ riser | mole % | 80 | 80 | 80 |
| $C_2^-$ riser | mole % | 1.3 | 1.3 | 1.2 |
| $H_2/C_3^-$ riser | mol/mol | 0.028 | 0.03 | 0.035 |
| $C_2^-/(C_2^- + C_3^-)$ | mol/mol | 0.016 | 0.015 | 0.015 |
| Component B (gas phase reactor) | | | | |
| Temperature | ° C. | 75 | 75 | 75 |
| Pressure | MPa | 18 | 19 | 20 |
| $C_2^-/C_2^- + C_3^-$ | mol/mol | 0.22 | 0.21 | 0.21 |
| $H_2/C_2^-$ | mol/mol | 0.14 | 0.35 | 0.35 |

TABLE 1-continued

|  | Example | | |
|---|---|---|---|
|  | Comp ex 2 | ex 1 | Comp ex 3 |

$H_2$ hydrogen,
$C_2^-$ ethylene
$C_3^-$ propylene

The polyolefin composition of example 1 and comparative examples 2 and 3 have been extruded under nitrogen atmosphere in a twin screw extruder, at a rotation speed of 250 rpm and a melt temperature of 200-250° C. with the additives reported in table 2 and pelletized. The polymers features are reported in table 3

TABLE 2

|  |  | Example | | |
|---|---|---|---|---|
|  |  | Comp ex 2 | ex 1 | Comp ex 3 |
| Glycerol Monostearate 90 | wt % | 0.09 | 0.09 | 0.09 |
| Irganox 1010 | wt % | 0.05 | 0.05 | 0.05 |
| Irgafoss 168 | wt % | 0.10 | 0.10 | 0.10 |
| Calcium stearate | wt % | 0.05 | 0.05 | 0.05 |
| Millad 3988 | wt % | 0.18 | 0.18 | 0.18 |

TABLE 3

|  |  | Example | | |
|---|---|---|---|---|
|  |  | Comp ex 2 | ex 1 | Comp ex 3 |
| Component a) | | | | |
| Copolymer content | % | 87 | 85 | 87 |
| Ethylene content | wt % | 2.3 | 2.5 | 2.6 |
| MFR | g/10' | 20 | 23 | 40 |
| Xylene soluble at 25° C. | wt % | 4.5 | 5.3 | 4.8 |
| Component b) | | | | |
| Copolymer content | wt % | 13 | 15 | 13 |
| Ethylene content in component b) | wt % | 38 | 27 | 32 |
| Property of the composition | | | | |
| Xylene soluble at 25° C. | wt % | 15.9 | 17.4 | 15.6 |
| MFR | g/10' | 18 | 26 | 37 |
| XSIV (intrinsic viscosity of XS) | dl/g | 1.56 | 1.10 | 1.10 |
| Flexural Modulus | MPa | 850 | 850 | 930 |
| Izod impact at 23° C. | KJ/m² | 6.1 | 10.5 | 4.9 |
| D/B TT | ° C. | −10.0 | −10.6 | 1.0 |
| HAZE (1 mm plaque) | % | 86 | 36 | 37 |
| Elongation @ break | % | 680 | >720 | 580 |
| Melting temperature | ° C. | 152.1 | 151.3 | 151.8 |

What is claimed is:

1. A propylene-ethylene copolymer composition comprising:
   A) 81-91 wt % of a propylene-ethylene copolymer comprising 1.0-3.5 wt % of ethylene derived units having a fraction soluble in xylene at 25° C. 3-10 wt %; and a melt flow rate (MFR L; ISO 1133, condition L, 230° C. and 2.16 kg load) of 5-50 g/10 min;
   B) 9-19 wt % of a propylene-ethylene copolymer comprising 21.0-31.0 wt % of ethylene derived units;
   wherein the sum A)+B) is 100%; and
   the composition comprises less than 9.1 wt % ethylene, a melt flow rate (MFR L; ISO 1133, condition L, 230° C. and 2.16 kg load) of 20-35 g/10 min; a xylene soluble fraction at 25° C. of 10.0-25.0 wt %; and an intrinsic viscosity of the fraction soluble in xylene at 25° C. of 0.7-1.9 dl/g.

2. The propylene polymer composition of claim 1, comprising:
   A) 83-89 wt % of component A); and
   B) 11-17 wt % of component B).

3. The propylene polymer composition of claim 1, wherein A) comprises 1.5-3.0 wt % of ethylene derived units.

4. The propylene polymer composition of claim 1, wherein B) comprises 23.0-29.0 wt % of ethylene derived units.

5. The propylene polymer composition of claim 1, wherein the polyolefin composition has a melt flow rate (MFR L; ISO 1133, condition L, 230° C. and 2.16 kg load) of 2232 g/10 min.

6. The propylene polymer composition of claim 1, wherein the intrinsic viscosity of the fraction soluble in xylene at 25° C. is 0.9-1.4 dl/g.

7. The propylene polymer composition of claim 1, wherein the composition is not visbroken.

8. The propylene polymer composition of claim 2, wherein A) comprises 1.5-3.0 wt % of ethylene derived units.

* * * * *

UNITED STATES PATENT AND TRADEMARK OFFICE
CERTIFICATE OF CORRECTION

| | | |
|---|---|---|
| PATENT NO. | : 9,969,870 B2 | Page 1 of 1 |
| APPLICATION NO. | : 15/313456 | |
| DATED | : May 15, 2018 | |
| INVENTOR(S) | : Massari et al. | |

It is certified that error appears in the above-identified patent and that said Letters Patent is hereby corrected as shown below:

On the Title Page

In Column 2, Item (57), under 'Abstract', Line 11, delete "an" and insert -- a --

In the Specification

In Column 1, Line 25, after "a" delete "a"

In Column 2, Line 18, delete "an" and insert -- a --

In Column 2, Line 48, delete "an" and insert -- a --

In Column 3, Line 7, delete "step," and insert -- steps, --

In Column 4, Line 31, delete "cycloakyl s" and insert -- cycloakyls --

In Column 6, Line 41, insert -- $R^{III}$ --, before "and $R^{IV}$"

In Column 8, Line 3, delete "metil" and insert -- methyl --

In Column 9, Line 49, delete "fraction" and insert -- fractions --

Signed and Sealed this  
First Day of February, 2022

Drew Hirshfeld  
*Performing the Functions and Duties of the*  
*Under Secretary of Commerce for Intellectual Property and*  
*Director of the United States Patent and Trademark Office*